(12) United States Patent
Vigeant et al.

(10) Patent No.: US 7,946,620 B2
(45) Date of Patent: May 24, 2011

(54) PASSENGER AIRBAG

(75) Inventors: Peter L. Vigeant, Whitmore Lake, MI (US); David Laird Geyer, Sterling Heights, MI (US); Robert Andrew Parks, Berkley, MI (US)

(73) Assignee: Toyoda Gosei Co. Ltd. (JP)

( * ) Notice: Subject to any disclaimer, the term of this patent is extended or adjusted under 35 U.S.C. 154(b) by 0 days.

(21) Appl. No.: 12/637,068

(22) Filed: Dec. 14, 2009

(65) Prior Publication Data

US 2010/0156075 A1 Jun. 24, 2010

Related U.S. Application Data (63) Continuation-in-part of application No. 11/343,992, filed on Jan. 31, 2006, now Pat. No. 7,654,556.

(51) Int. Cl.
*B60R 21/16* (2006.01)

(52) U.S. Cl. .................................. 280/743.1

(58) Field of Classification Search ............... 280/728.2, 280/732, 740, 742, 743.1
See application file for complete search history.

(56) References Cited

U.S. PATENT DOCUMENTS

| | | | |
|---|---|---|---|
| 2,729,386 A | 1/1956 | Haddad | |
| 3,079,025 A | 2/1963 | Herman | |
| 3,613,931 A | 10/1971 | Schifferle | |
| 4,221,302 A | 9/1980 | Kupersmit | |
| 4,782,972 A | 11/1988 | Wenkman et al. | |
| 5,058,919 A * | 10/1991 | Paquette et al. | 280/732 |
| 5,069,480 A | 12/1991 | Good | |
| 5,332,256 A | 7/1994 | Lauritzen et al. | |
| 5,407,223 A | 4/1995 | Lauritzen et al. | |
| 5,458,364 A | 10/1995 | Mueller et al. | |
| 5,511,819 A | 4/1996 | Spilker et al. | |
| 5,558,241 A | 9/1996 | Huffstutler, Jr. et al. | |
| 5,564,732 A | 10/1996 | Bauer et al. | |
| 5,566,973 A | 10/1996 | Green et al. | |
| 5,582,423 A * | 12/1996 | Rion et al. | 280/728.2 |
| 5,588,667 A | 12/1996 | Emambakhsh et al. | |
| 5,611,562 A | 3/1997 | Kelley et al. | |
| 5,676,360 A | 10/1997 | Boucher et al. | |
| 5,676,390 A | 10/1997 | Olson | |
| 5,692,768 A | 12/1997 | Mihm et al. | |
| 5,711,444 A | 1/1998 | Meacham et al. | |
| 5,732,971 A | 3/1998 | Lutz | |
| 5,765,867 A * | 6/1998 | French | 280/743.2 |
| 5,791,685 A * | 8/1998 | Lachat et al. | 280/743.1 |
| 6,161,862 A | 12/2000 | Rose et al. | |
| 6,161,865 A | 12/2000 | Rose et al. | |
| 6,375,219 B2 | 4/2002 | Keshavaraj | |
| 2005/0082793 A1 | 4/2005 | Lee | |
| 2005/0218630 A1 * | 10/2005 | Tata et al. | 280/728.2 |

* cited by examiner

*Primary Examiner* — Paul N Dickson
*Assistant Examiner* — Robert A Coker
(74) *Attorney, Agent, or Firm* — Carlson, Gaskey & Olds PC (57) ABSTRACT

An airbag includes end panels sewn onto opposite ends of the airbag. The end panels include side tabs and a center tab. The side tabs hook onto a retainer. The center tab is sewn to the airbag adjacent the opening in the retainer to pull the airbag against the concave inner surface of the retainer, thereby eliminating bunching and folding of airbag material at the interface of the retainer and inflator.

15 Claims, 10 Drawing Sheets

PASSENGER AIRBAG

This application is a continuation-in-part of U.S. Ser. No. 11/343,992, filed Jan. 31, 2006 now U.S. Pat. No. 7,654,556.

BACKGROUND OF THE INVENTION

The present invention relates generally to an airbag.

Passenger airbag modules typically include a housing having spaced apart side walls connected to one another by a rear wall. Some passenger airbag modules include a generally cylindrical inflator retained in the housing by a semi-cylindrical retainer through which large holes are formed. The opening in the airbag fits around the retainer and is secured to the housing and the inflator by the retainer. However, around the cylindrical inflator, the material in the airbag can become bunched up or folded in an uncontrolled manner between the retainer and inflator. This can create gaps between the retainer and inflator through which the inflator gas may pass.

SUMMARY OF THE INVENTION

An airbag according to the present invention provides an improved fit in the airbag module by conforming to the curved interior surface of the retainer before it is assembled over the inflator. In an example embodiment, the airbag includes end panels sewn onto opposite ends of the airbags. The end panels include side tabs and a center tab. The side tabs hook onto the retainer. The center tab is sewn to the airbag adjacent the opening in the retainer to pull the airbag against the concave inner surface of the retainer, thereby eliminating bunching and folding of airbag material at the interface of the retainer and inflator.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
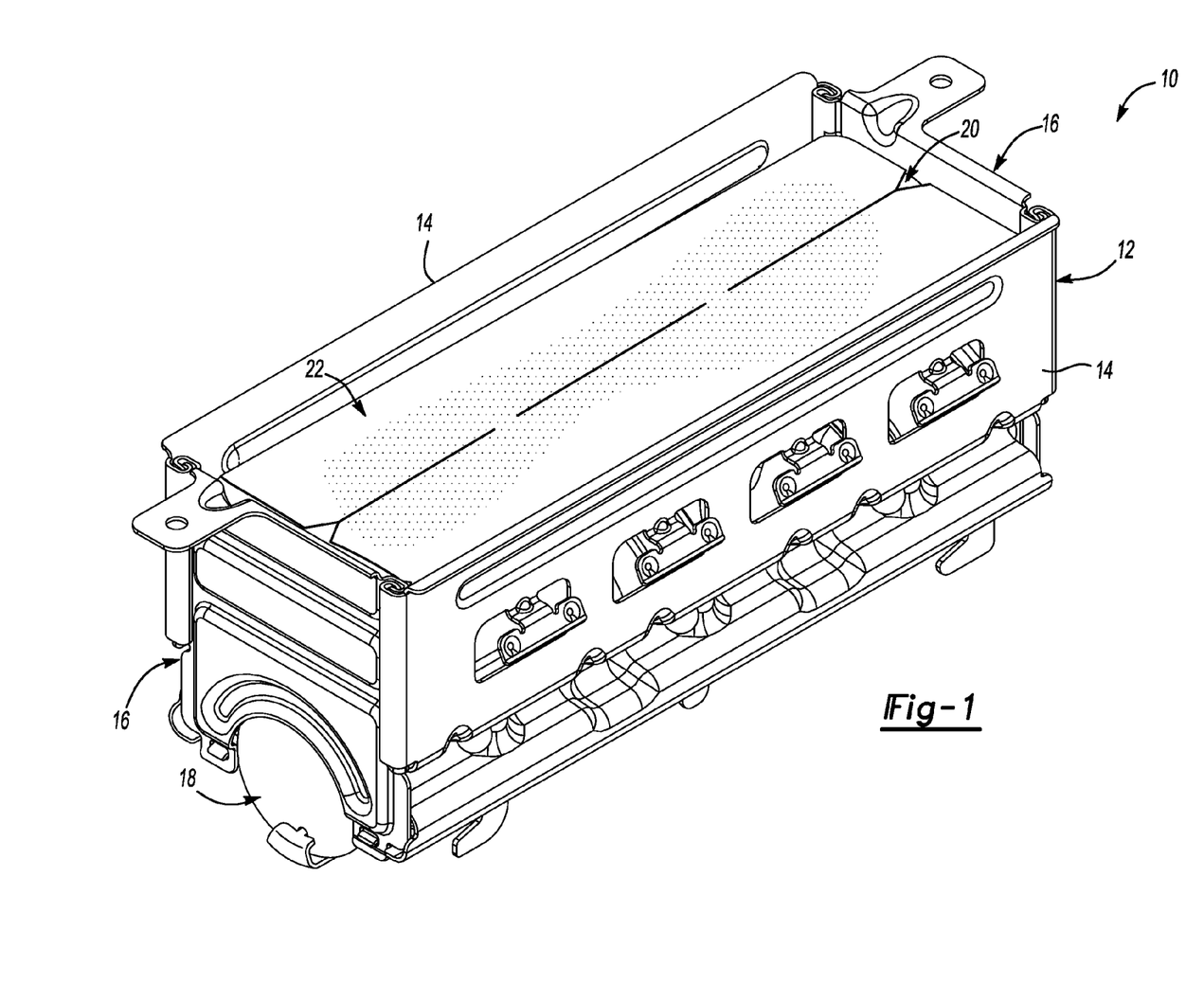
FIG. 1 is a perspective view of a passenger airbag module incorporating an example embodiment of an airbag according to the present invention.

A passenger airbag module 10 is shown in FIG. 1. The module 10 includes a housing 12 having spaced apart side walls 14 and end walls 16. An example embodiment of an airbag 20 according to the present invention is folded and stored within the housing 12 and covered by a wrap 22. A generally cylindrical inflator 18 is retained in the housing 12 below the airbag 20.

Figure 2:
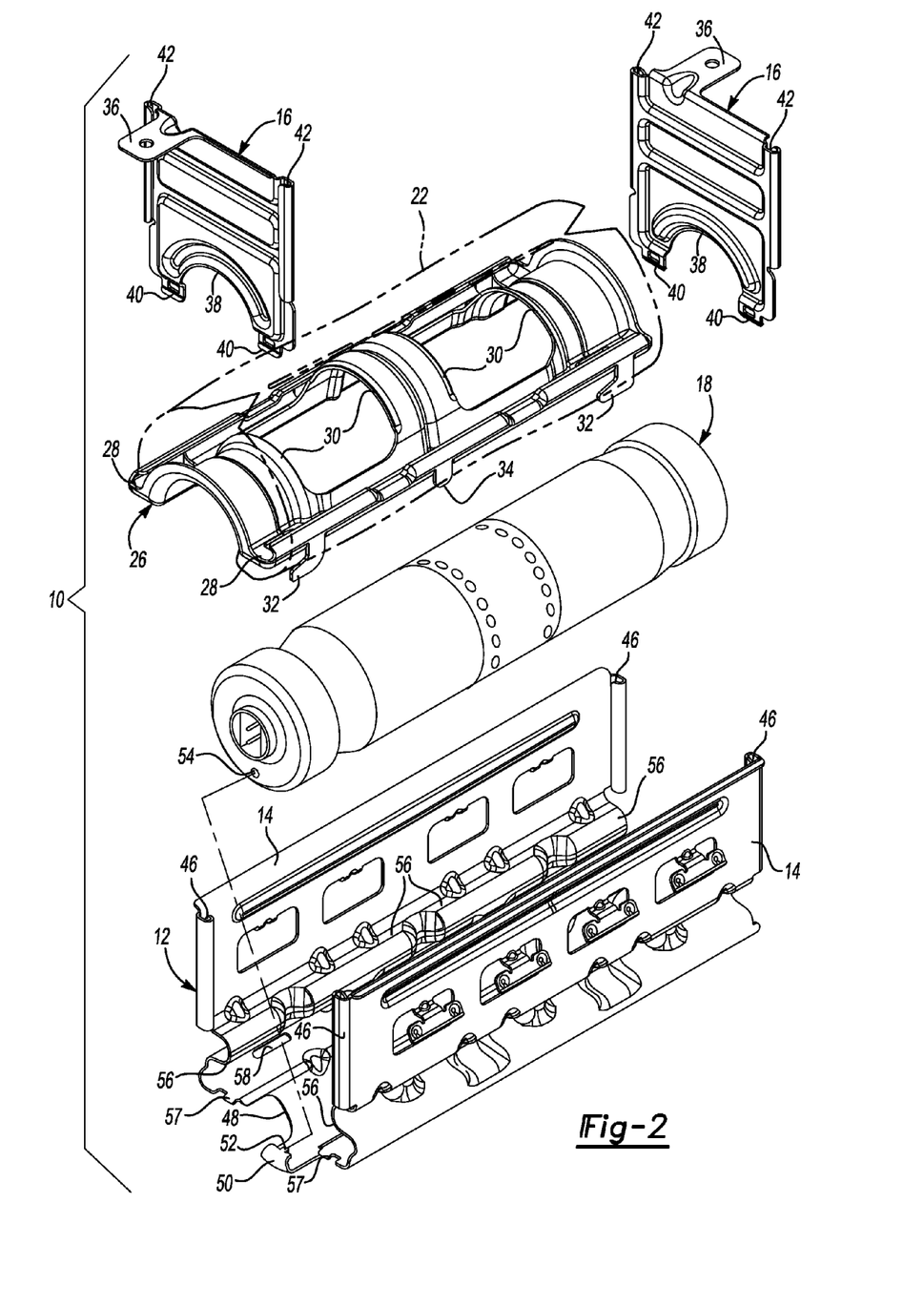
FIG. 2 is an exploded view of the module of FIG. 1.

FIG. 2 is an exploded view of the module 10 of FIG. 1. For clarity, the airbag 20 is not shown and the wrap 22 is shown in phantom. As shown, a generally semi-cylindrical retainer 26 includes a pair of generally parallel spaced apart rails 28 connected by three semi-cylindrical arches 30 defining large openings therebetween. A plurality of L-shaped legs 32 project downwardly from the rails 28. Middle legs 34 projecting downwardly from the rails 28 are spaced off-center between the L-shaped legs 32 in order to prohibit installation of the retainer 26 into the housing 12 in the reversed orientation. The middle legs 34 could also be L-shaped.

Each end wall 16 includes a mounting tab 36 projecting outwardly from an upper edge. Each end wall 16 further includes an arched opening 38 at its lower edge between a pair of snap-fit end tabs 40. The side edges of each end wall 16 include U-shaped channels 42 opening inwardly toward one another. Complementary outwardly opening U-shaped channels 46 are formed on end edges of the side walls 14 of the housing 12.

As can be seen in FIG. 2, the side walls 14, together with a rear wall 48, are formed integrally of a stamped metal sheet. The rear wall 48 includes an inwardly turned tab 50 having an axial pin 52 protruding toward the interior of the housing 12. The pin 52 is complementary to a small aperture 54 at an axial end of the inflator 18. This ensures a proper rotational orientation of the inflator 18 within the housing 12. End snap-tabs 57 project axially outwardly from each axial end of the rear wall 48.

The side walls 14 each include a plurality of inward projections 56 stamped therein. The projections 56 are generally semi-cylindrical and could extend continuously across the entire length of the side walls 14, but preferably are spaced intermittently to provide selected, controlled contact. Slots 58 are formed through the housing 12 below the projections 56.

Although the airbag 20 (not shown in FIG. 2) will be shown assembled into this specific preferred module 10 for purposes of illustration, it should be understood that the airbag 20 could be used beneficially with any module 10 with a retainer 26 having a concave inner surface and/or an inflator 18 with a convexly curved outer surface. For example, there are many airbag module designs that accommodate cylindrical inflators in various ways.

Figure 3:
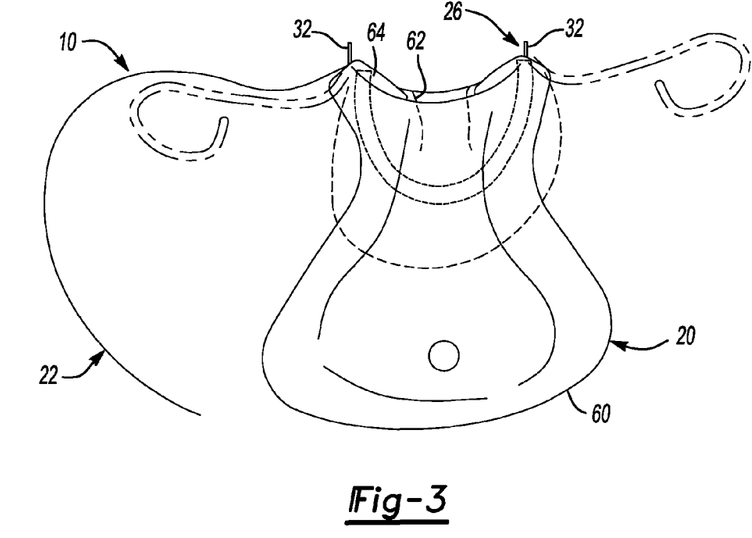
FIG. 3 is a side view of the retainer and airbag of FIG. 1 with the airbag partially unfolded.

FIG. 3 is a side view illustrated attachment of the airbag 20 to the retainer 26. The airbag 20 includes a front panel portion 60 opposite an opening 62 defined by a reinforced perimeter portion 64 of a rear panel portion around the opening 62. The retainer 26 is placed inside the airbag 20 through the opening 62. The legs 32 of retainer 26 are then inserted through the reinforced perimeter portion 64 of the airbag 20.

Figure 4:
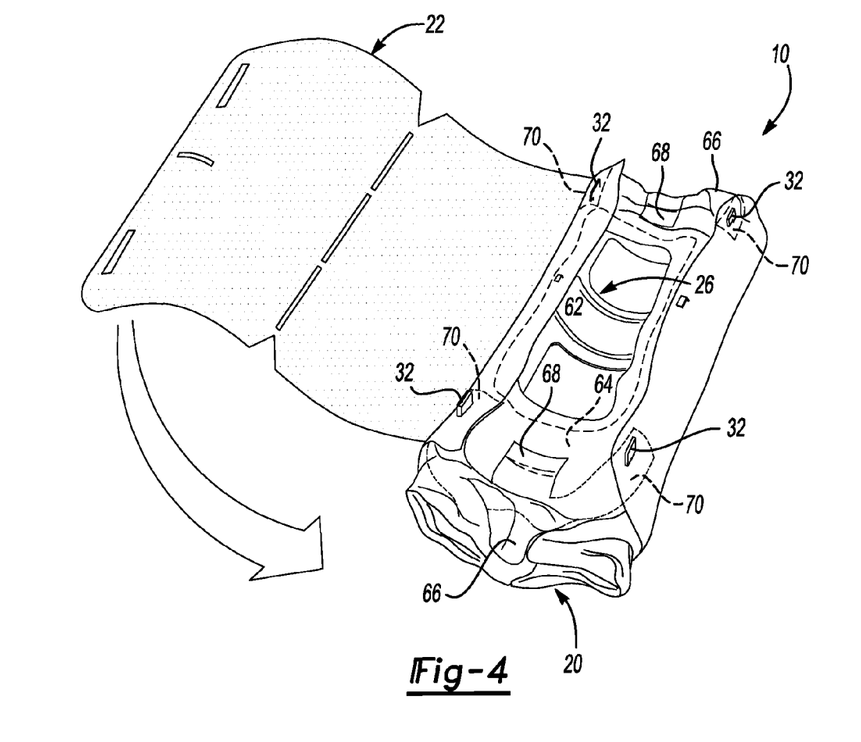
FIG. 4 is a bottom perspective view of the retainer and airbag of FIG. 3 with the airbag folded.

FIG. 4 is a perspective bottom view of the retainer 26 and airbag 20 of FIG. 3 with the airbag 20 in its folded position. The airbag 20 includes a pair of end panels 66 sewn onto ends of the airbag 20. The end panel 66 includes a center tab 68 and side tabs 70. The legs 32 of the retainer 26 are inserted through slots through the side tab 70. The center tab 68 is sewn to the airbag between the side tabs 70 in order to fit the airbag 20, particularly the reinforced perimeter portion 64 around the opening 62, to the concave inner surface of the retainer 26. This is shown more clearly in FIG. 5. The end panel 66 is sewn by stitching 67 to the end of the airbag 20. The center tab 68 is sewn by stitching 69 to the airbag 20 adjacent the reinforced perimeter portion 64 and opening 62 to fit the airbag 20 to the concave inner surface of the retainer 26. During assembly of the airbag 20 to retainer 26, the legs 32 are inserted through slots in the airbag 20 adjacent the reinforced perimeter portion 64. The legs 32 are then inserted through slots in the side tabs 70 of the end panel 66. The wrap 22 is then wrapped around the folded airbag 20 to keep the airbag 20 in its folded position during shipping and assembly.

Figure 5:
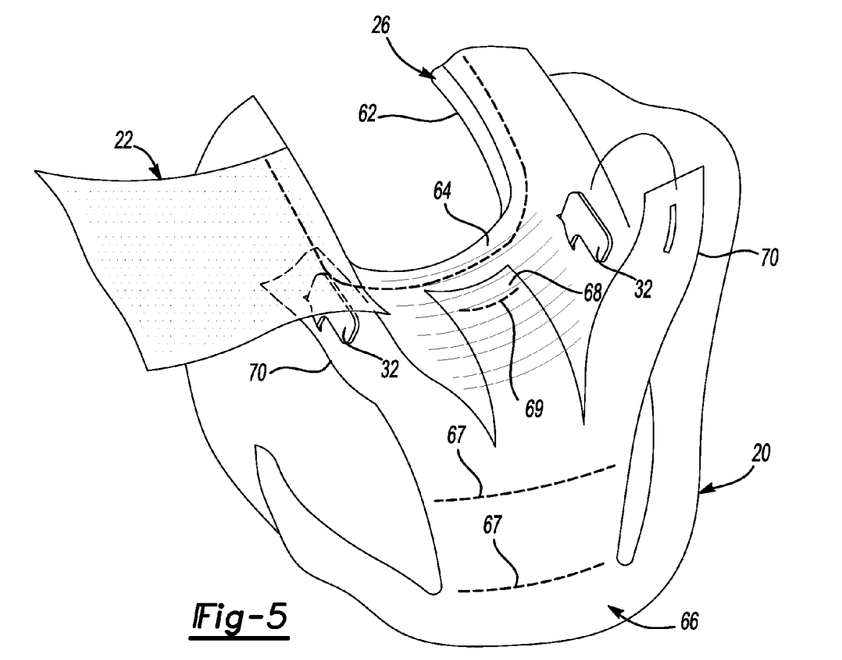
FIG. 5 is an enlarged bottom perspective view of the retainer and airbag of FIG. 4, showing a final step in the assembly process of the airbag to the retainer.
Figure 5A:
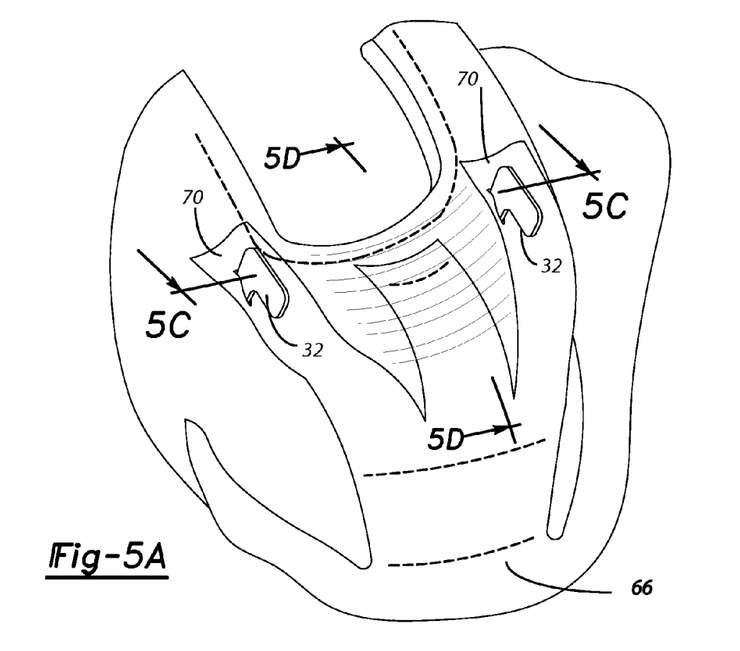
FIG. 5A is a view similar to FIG. 5, with the airbag completely secured to the retainer.

FIG. 5A is a view similar to FIG. 5, with the airbag 20 secured to the retainer. The legs 32 have all been inserted through slots in the side tabs 70 of the end panel 66 and the wrap 22 is wrapped around the folded airbag 20.

Figure 5B:
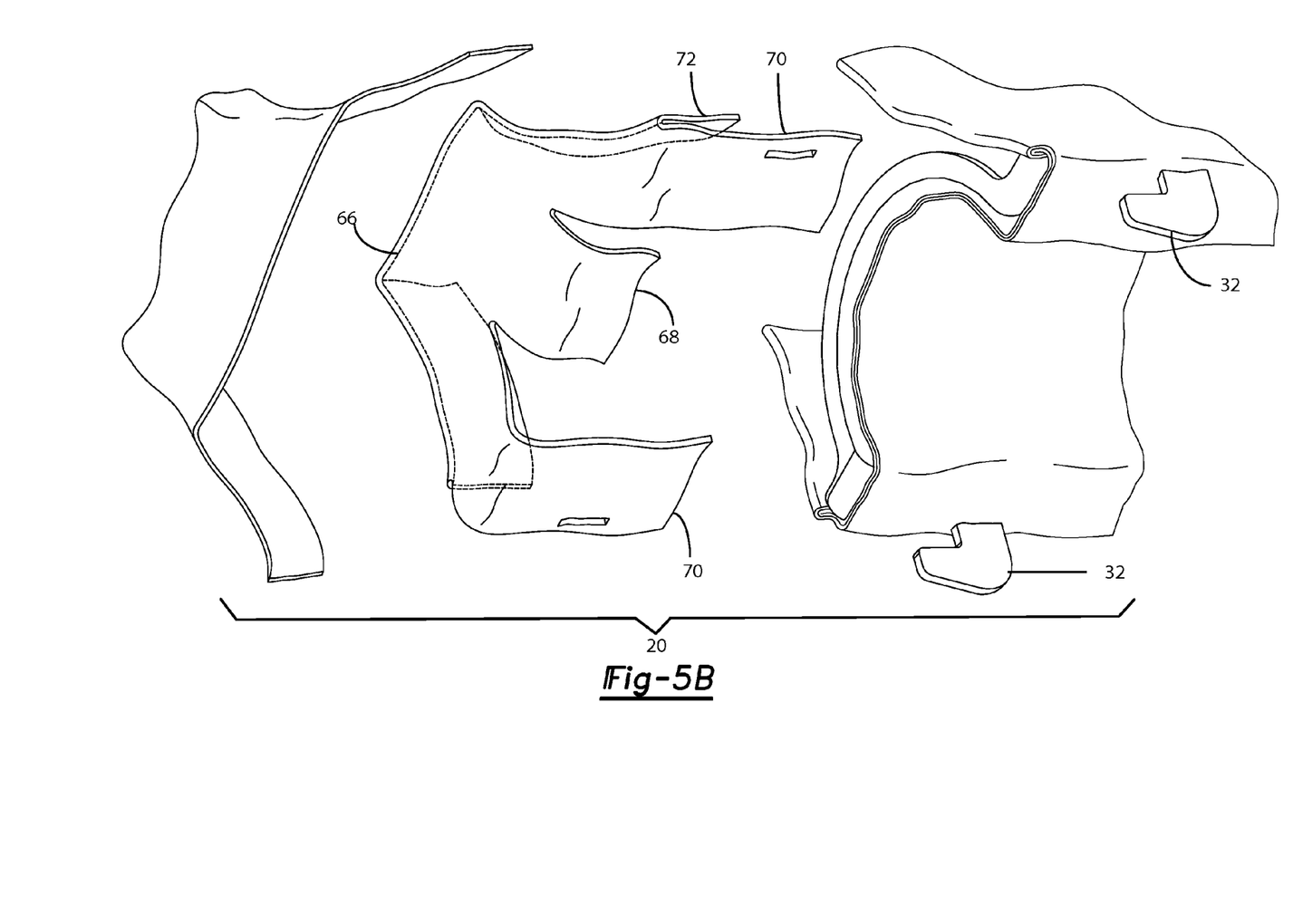
FIG. 5B illustrates the retainer and airbag of FIG. 5, showing the airbag in an exploded view.

FIG. 5B illustrates the retainer 26 and airbag 20 of FIG. 5, showing the airbag 20 in an exploded view. As shown, the example airbag 20 includes a separately formed end panel 66 (subsequently sewn onto the end of the airbag 20). The end panel 66 includes a center tab 68 and side tabs 70 having slots formed therein. A side panel 72 secures the body of the airbag 20 to the end panel 66 to form the airbag 20 into a bag. Other arrangements of panels could be provided.

Figure 5C:
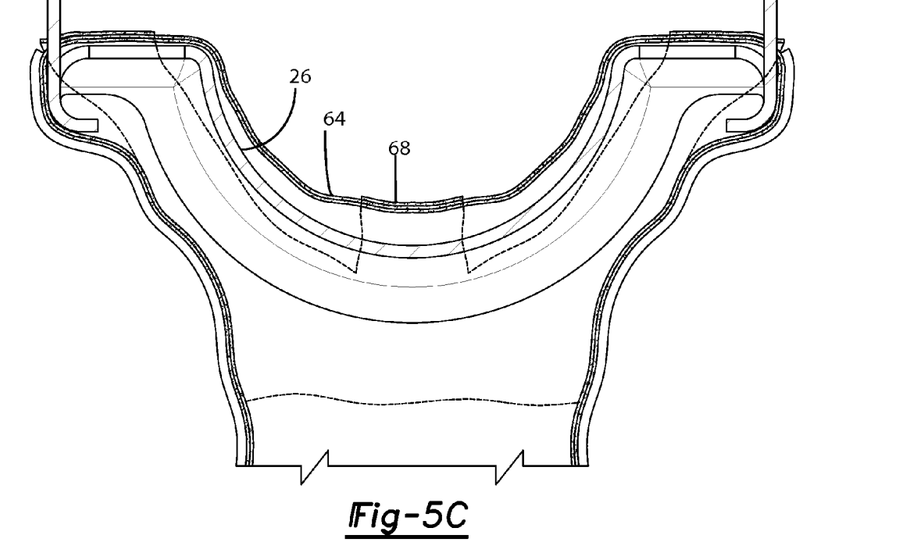
FIG. 5C is a section view taken along line 5C-5C of FIG. 5.
Figure 5D:
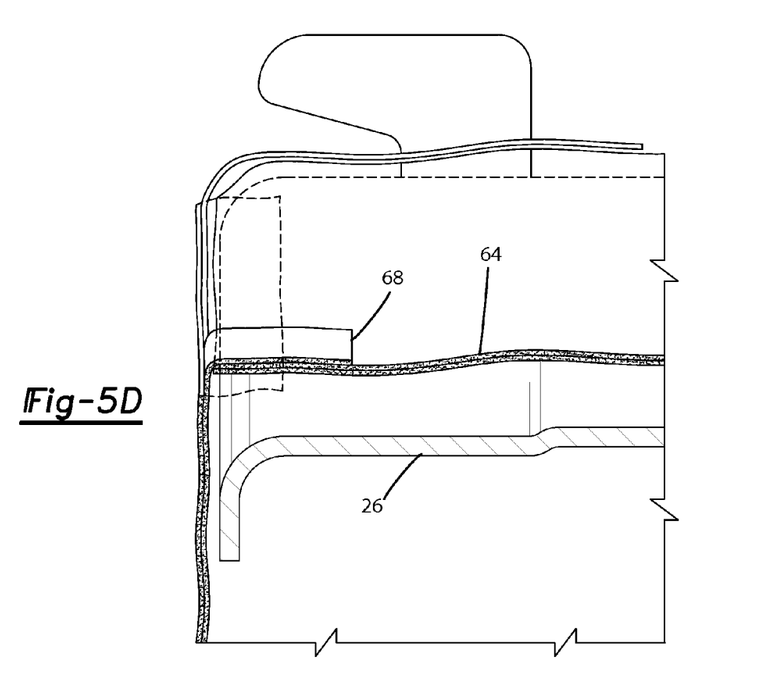
FIG. 5D is a section view taken along line 5D-5D of FIG. 5.

FIGS. 5C and 5D are section views taken along lines 5C-5C and 5D-5D of FIG. 5, respectively. The center tab 68 conforms the reinforced perimeter portion 64 to the concave curved interior surface of the retainer 26. Therefore, the retainer 26 and airbag 20 assembly is ready to be assembled over an inflator 18 (FIG. 2) without the airbag 20 becoming bunched up or folded between the inflator 18 and retainer 26.

Figure 6:
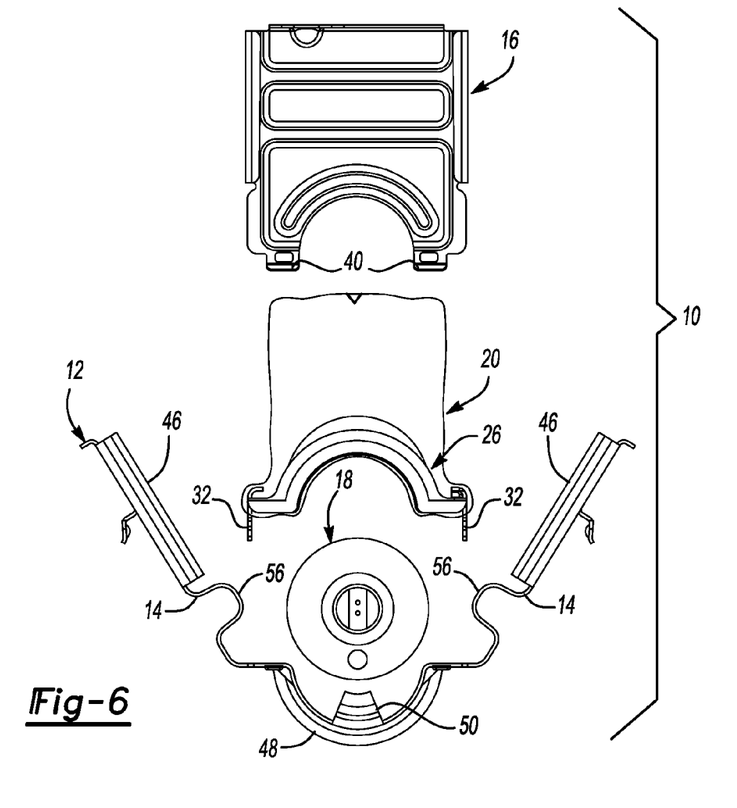
FIG. 6 is an exploded end view of the module of FIG. 1 with the housing in a pre-assembly state.

FIG. 6 is an end view showing assembly of the retainer 26 and airbag 20 into the module 10. In the example module 10 that is shown, the housing 12 is sheet metal that is stamped and bent to the shape shown in FIG. 6. Housings with separately formed and attached pieces could also be used. The inflator 18 is then inserted or placed into the housing 12 against the rear wall 48. The retainer 26 and airbag 20 are then placed over the inflator 18 without the airbag 20 becoming bunched or folded in an undesired way.

Figure 7:
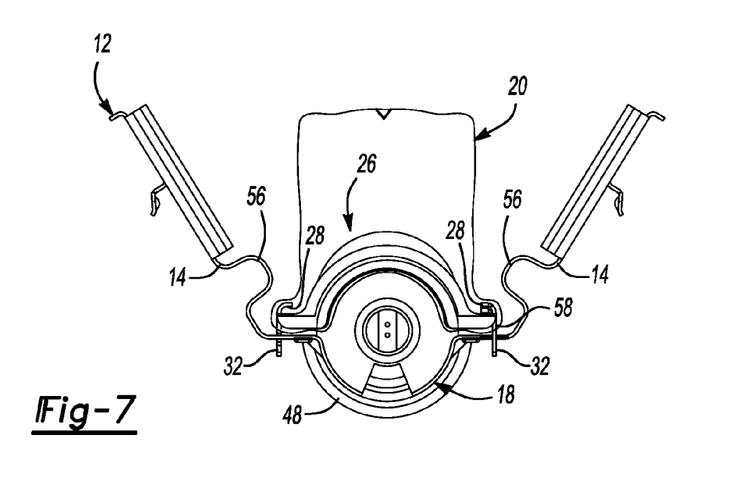
FIG. 7 is an end view similar to FIG. 6 with a retainer and airbag inserted into the housing.

In the example module 10 shown, the legs 32 of the retainer 26 are inserted through the slots 58 in the housing 12 as shown in FIG. 7, and the retainer 26 and airbag 20 are then slid axially such that the L-shaped legs 32 are inserted under the housing 12. The axial movement of the retainer 26 and the airbag 20 relative to the housing 12 to hook the L-shaped legs 32 ensures the proper orientation of the airbag 20. If the retainer 26 and airbag 20 were oriented 180 degrees from the proper orientation, they would also be slid in the wrong direction to hook the legs 32. This would position at least part of the retainer 26 and/or airbag 20 over the end edge of the housing 12, thereby preventing installation of the endcap 16, which would alert the installer to the improper orientation.

Figure 8:
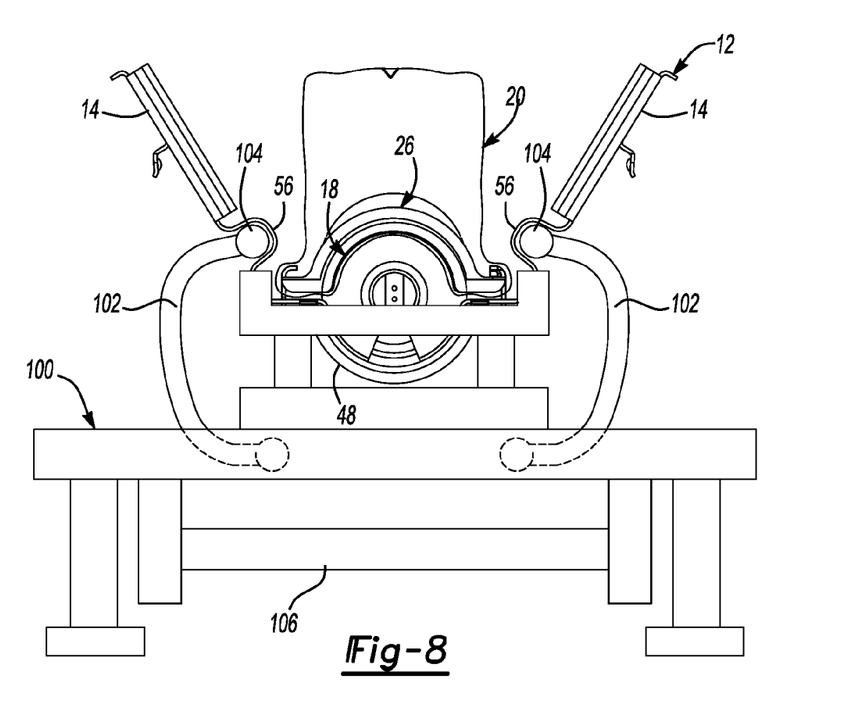
FIG. 8 is an end view of the module of FIG. 7 placed on tooling.
Figure 9:
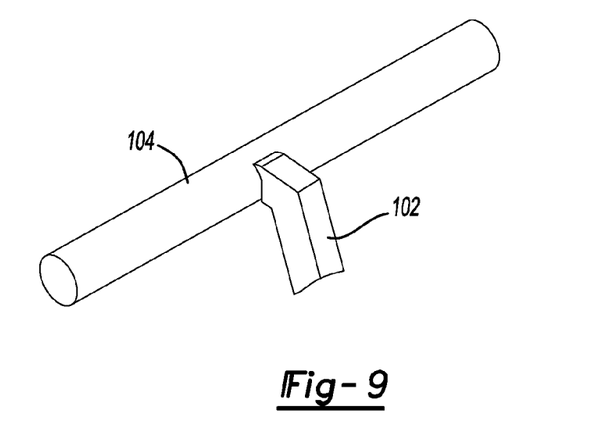
FIG. 9 is an enlarged view of one of the arms of the tooling of FIG. 8.

The assembly of FIG. 7 is then inserted into a tool 100 shown schematically in FIG. 8. The tool 100 includes a pair of opposed arms 102 each having a horizontal bar 104 (an enlarged perspective view of which is shown in FIG. 9). The arms 102 include a mechanism 106 for pressing the bars 104 toward one another, such as a hydraulic, pneumatic or motorized actuator or a lever operated manually by a person. The horizontal bars 104 are aligned behind the projections 56 of the side walls 14.

Figure 10:
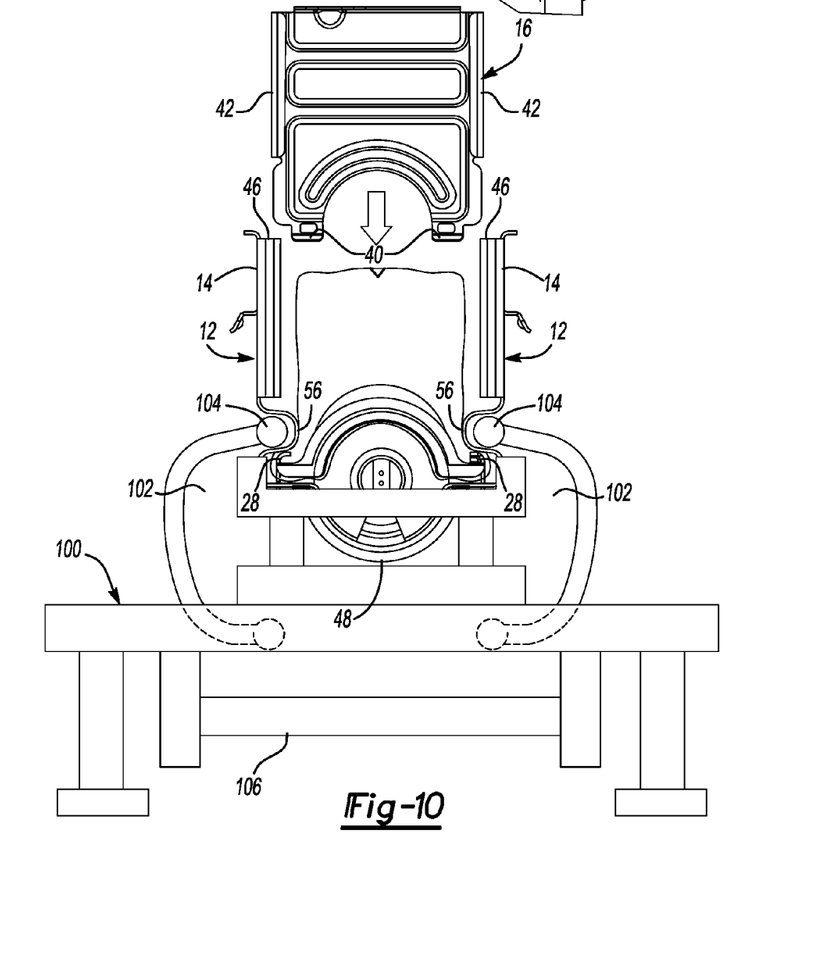
FIG. 10 is a view similar to FIG. 8 after the walls of the housing have been bent to their assembled position and showing the end cap installation.

The arms 102 push the horizontal bars 104 toward one another, thereby bending or deforming the side walls 14 upward to a generally parallel position as shown in FIG. 10. This positions the projections 56 of the walls 14 over the rails 28 of the retainer 26 thereby trapping the inflator 18 between the projections 56 and the rear wall 48 of the housing 12. The rails 28 and the arches 30 hold the airbag 20 in the housing 12 and prevent damage to the airbag 20 when the walls 14 are deformed inwardly and when the end walls 16 are slid into position.

The end walls 16 are then slid into position by aligning the channels 42 on the end walls 16 with the channels 46 on the side walls 14. As the end walls 16 are pushed downwardly, the snap-fit end tabs 40 snap onto end snap-tabs 57 on the housing 12 to retain the end walls 16 to the housing 12.

Figure 11:
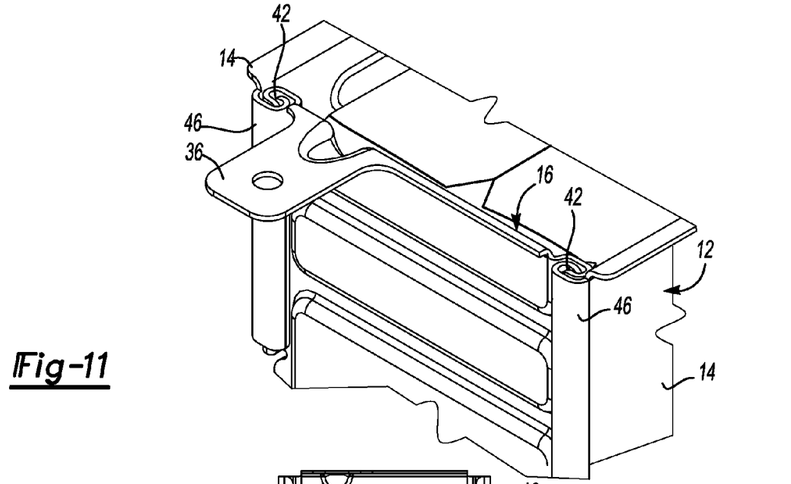
FIG. 11 is an enlarged perspective view of one end of the assembled module.

FIG. 11 is an enlarged perspective view of one end wall 16 connected or secured to the housing 12. As shown, the U-shaped channels 42 (opening inwardly) of the end walls 16 interlock with the U-shaped channels 46 (opening outwardly) of the side walls 14 thereby preventing outward deformation of the side walls 14.

Figure 12:
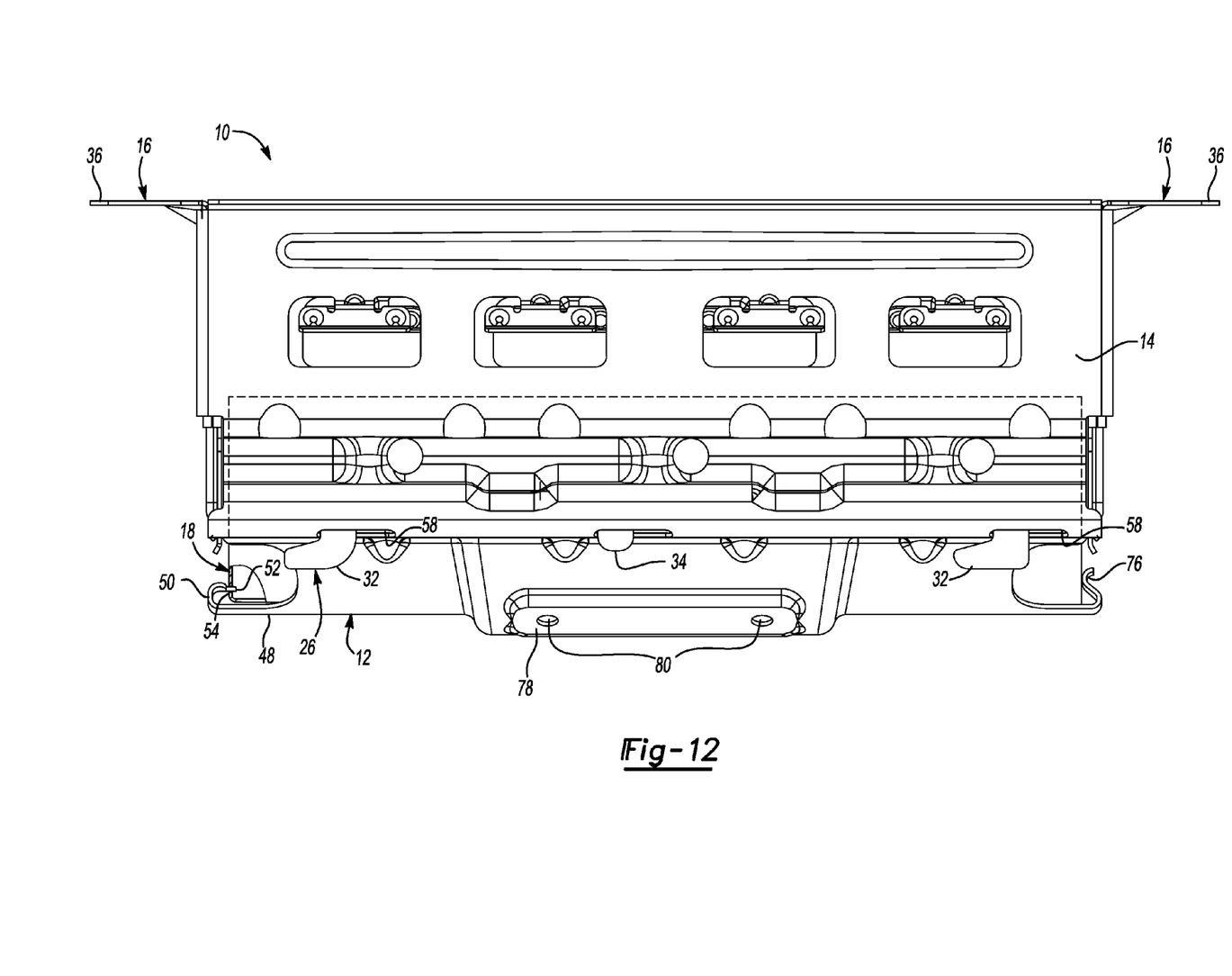
FIG. 12 is a side view of the assembled module.

FIG. 12 is a side view of the assembled module 10, with the inflator 18 shown in phantom and partially sectioned. The pin 52 on the end tab 50 is received within the aperture 54 in the axial end of the inflator 18. This ensures that the inflator 18 is inserted into the housing 12 in the proper orientation and holds the inflator 18 in the proper orientation during assembly and in use. Having a consistent, proper orientation of the inflator 18 provides a consistent orientation of the electrical connectors on the inflator 18, which facilitates assembly. It also prevents rotation of the inflator 18 in the field, which can twist the wires connected to the inflator 18.

As shown, the L-shaped legs 32 extending through the slots 58 and the housing 12 additionally secure the retainer 26 (and thereby the inflator 18) within the housing 12. A deformable end tab 76 is formed at the opposite axial end of the housing 12 to contact the opposite end of the inflator 18 to define the axial position of the inflator 18. Complementary locating features, such as ribs or flanges, may also be formed on the underside of the retainer 26 and the outer surface of the inflator 18 to define and preserve axial location.

As shown, a mounting bracket 78 may be stamped into the rear wall 48 of the housing 12. The mounting bracket 78 may include apertures 80 for connecting to the vehicle, although different methods of attachment of the housing in the vehicle can be used.

The airbag 20 provides a better fit to the concave surface of the retainer 26, thereby eliminating or reducing gaps through the material which may permit the escape of gas of the inflator 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, although the invention is described with respect to a passenger front airbag, it could also be used for any airbag location. Alphanumeric identifiers on method steps are for convenient reference in dependent claims and do not signify a required sequence of performance unless otherwise indicated in the claims.

What is claimed is:

1. An airbag comprising:
   a front panel portion;
   a perimeter portion circumscribing an opening opposite the front panel portion, the perimeter portion connected to the front panel portion; and
   a center tab attaching a side portion of the airbag to the perimeter portion of the airbag to conform a lower surface of the perimeter portion to a concave shape.

2. The airbag of claim 1 further including an end panel attached to the side portion, the end panel including the center tab.

3. The airbag of claim 2 wherein the end panel further includes a pair of side tabs integral therewith and extending freely from the airbag.

4. The airbag of claim 3 wherein the end panel is sewn to the side portion and wherein the center tab is sewn to the perimeter portion.

5. The airbag of claim 3 wherein the side tabs each include an opening therethrough.

6. The airbag of claim 3 wherein the end panel is a first end panel and further including a second end panel attached to the side portion opposite the first end panel, the second end panel having a center tab secured to the perimeter portion to hold the perimeter portion of the airbag in a concave position.

7. A method for shaping an airbag including the steps of:
   a) securing a first center tab to a side portion of an airbag, the side portion between a front panel portion and an opening to the airbag, the opening opposite the front panel portion; and
   b) securing the first center tab to the airbag adjacent the opening in order to conform an area of the airbag adjacent the opening to a concave shape.

8. The method of claim 7 further including the step of:
   c) attaching a first end panel to the side portion of the airbag, the first end panel including the first center tab.

9. The method of claim 8 further including the steps of:
   d) attaching a second end panel to the side portion of the airbag opposite the first end panel, the second panel including a second center tab extending therefrom; and
   e) attaching the second center tab to the airbag adjacent the opening to conform the area adjacent the opening to a concave shape.

10. The method of claim 8 wherein the first end panel further includes a pair of side tabs extending freely therefrom.

11. An airbag assembly comprising:
    a retainer including a pair of rails between which extend a plurality of arches, the plurality of arches defining a concave interior surface; and
    an airbag having a front panel section and a perimeter portion circumscribing an opening opposite the front panel portion, the retainer at least substantially disposed within the airbag, the perimeter portion having a concave shape to match the concave interior surface of the retainer.

12. The airbag assembly of claim 11 further including a center tab attached to a side portion of the airbag and to the perimeter portion of the airbag to conform the perimeter portion to the concave shape, wherein the concave shape is formed adjacent the opening.

13. The airbag assembly of claim 12 further including an end panel attached to the side portion, the end panel including the center tab.

14. The airbag assembly of claim 13 wherein the end panel further includes a pair of side tabs integral therewith, the pair of side tabs secured to the retainer.

15. The airbag of claim 13 wherein the end panel is sewn to the side portion and wherein the center tab is sewn to the perimeter portion.

* * * * *